United States Patent Office 3,347,902
Patented Oct. 17, 1967

3,347,902
PROCESS FOR PRODUCING 2-CYANO-BUTADIENES
Robert K. Grasselli, Garfield Heights, Janice L. Greene, Warrensville Heights, and Nancy R. Gray, Cleveland, Ohio, assignors to The Standard Oil Company, Cleveland, Ohio, a corporation of Ohio
No Drawing. Filed Apr. 12, 1965, Ser. No. 447,533
6 Claims. (Cl. 260—465.9)

ABSTRACT OF THE DISCLOSURE 2-cyano-butadiene-1,3 and alkyl derivatives thereof are prepared by the vapor phase dehydrocyanation of the corresponding 1,2-dicyanocyclobutane in the presence of a solid basic oxidation catalyst.

---

This invention relates to a novel process for the manufacture of cyano-substituted diene compounds and more particularly pertains to the process for producing 2-cyano butadienes by the catalytic dehydrocyanation and ring cleavage of 1,2-dicyano cyclobutanes.

Several methods are known for the production of 2-cyano butadiene-1,3. In one method methyl vinyl ketone is reacted with hydrogen cyanide to form methyl vinyl ketone cyanhydrin which is acetylated to 3-acetoxy-3-cyanobutene-1 which in turn is pyrolyzed at 550–570° C. to form 2-cyano butadiene-1,3 or cyanoprene. The foregoing procedure is described in British Patent No. 482,300, J. Am. Chem. Soc. 70, 1775 (1948) and U.S. Patent No. 2,205,239.

Another process for the preparation of cyanoprene involves the selective dehydration of methyl vinyl ketone cyanhydrin by means of phosphoric acid at 550° C. and this process is described in German Patents Nos. 1,081,006 and 1,113,216.

Our process is completely unlike any of the prior art processes. We have discovered the process in which a cyclobutane-1,2-dicyanide compound of the structure

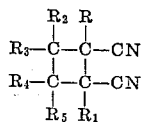

is cleaved and dehydrocyanated to produce predominantly a product which is believed to have the structure

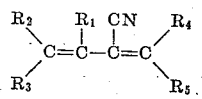

wherein R, $R_1$, $R_2$, $R_3$, $R_4$ and $R_5$ is each independently selected from the group consisting of hydrogen and a hydrocarbon radical, preferably an alkyl group, having from 1 to 6 carbon atoms and wherein at least one of R and $R_1$ must always be hydrogen. Most preferred as a starting material is cyclobutane-1,2-dicyanide (1,2-dicyanocyclobutane) itself.

The instant process is a catalytic reaction which is believed to involve the removal of a hydrogen cyanide group accompanied by ring opening. The instant process is preferably carried out in the vapor phase. The present process is indeed unexpected because the non-catalytic pyrolysis of 1,2-dicyanocyclobutane yields acrylonitrile.

We have found that cyanoprene, for instance, is readily obtained in very high yields and in conversions on the order of 50% or more by passing 1,2-dicyanocyclobutane over a basic solid catalyst in the temperature range of from 200 to 600° C. and preferably in the range of from 250 to 500° C. and at low partial pressures of the 1,2-dicyanocyclobutane, i.e., in the range of from about 1 to 100 mm. Lowering of the partial pressure of the reactant by means of an inert diluent is very effective in raising the selectivity of the desired product. Diluents such as air, oxygen, nitrogen, steam, carbon dioxide and the like may be advantageously employed. The process of this invention may also be carried out under a partial vacuum. Contact times between the feed and the catalyst may range from 0.01 to 50 seconds and preferably from 0.1 to 15 seconds.

The catalysts found to be particularly effective for this reaction are those which are basic rather than acidic and those which are oxidation or oxydehydrogenation catalysts are particularly effective. To illustrate the wide range of effective catalysts for this reaction, catalysts such as those containing magnesium oxide and zinc oxide, antimony and uranium oxides, antimony and iron oxides, antimony and manganese oxides, antimony and thorium oxides, antimony and cerium oxides, and catalysts containing any two metal oxides in combination with antimony oxide and the like. The foregoing catalysts can also be promoted with up to 10% by weight of the active catalyst of an oxide of at least one of the following elements: rhenium, niobium, copper, silver, thorium, tungsten, lead, bismuth, palladium, iridium, cadmium, zirconium, molybdenum, zinc, thallium, calcium, gallium, tantalum, barium, platinum, boron, magnesium, cobalt and nickel. Other active catalysts for the present process are bismuth molybdate, bismuth phosphomolybdate, antimony bismuth molybdate, antimony bismuth phosphomolybdate, and bismuth phosphotungstate. The latter group of bismuth-containing catalysts may also be modified with alkali, alkaline earth or Group VIII metal oxides. Also useful as catalysts in this invention in addition to those previously mentioned are the alkali and alkaline earth metal oxides, hydroxides, carbonates and other salts of weak acids and such materials include, but are not limited to, soduim hydroxide, potassium hydroxide, calcium oxide, calcium hydroxide, barium oxide, barium hydroxide, sodium carbonate, potassium carbonate, magnesium carbonate, calcium carbonate, barium carbonate, sodium acetate and the like.

The catalysts useful in the present invention may be used per se or in conjunction with a support such as silica, alumina, silica-alumina, alumina-magnesia, titania, zirconia, silicon carbide or zirconum. The support may constitute up to 90% of the catalyst composition by weight. Before use, the catalyst may be heat treated or calcined at an elevated temperature. Such treatment often improves the attrition resistance of the catalyst.

The products of the instant process, typified by cyanoprene, are useful polymerizable monomers for the production of polymers and copolymers which have utility as elastomers, plastics, films and fibers.

The process of this invention is further illustrated in the following examples.

Example I

The reactor employed in obtaining the results shown in Table I was a glass tube mounted vertically, wound with heating tape and insulated with asbestos tape. The tube was packed with a volume of 47 ml. of catalyst. The internal temperature of the reactor was measured by a thermocouple. The reaction charge was added to the reactor using a motor-driven syringe or by a dropping funnel. When reduced pressure was employed, the dropping funnel was used to introduce the reactant into the reactor.

A summary of the experimental work demonstrating the effect of operating variables and catalyst compositions in the process wherein 1,2-dicyano cyclobutane was employed as the reactant and cyanoprene was recovered as the product is found in Table I. It is apparent from the results shown in Table I that a catalyst is required in the instant process. No cyanoprene was obtained in reactions carried out in the presence of an inert material (Filtros, which is an inert, low surface area, porous silica) even at reduced pressure. The data in Table I also indicate that lower reaction temperatures and pressures and shorter contact times favor the instant process.

A zinc oxide:magnesium oxide catalyst containing three parts by weight of zinc oxide and one part by weight of magnesium oxide was prepared by mixing together 750 g. of zinc oxide and 250 g. of magnesium oxide with a small amount of water and extruding the resulting paste through an ⅛" internal diameter die. The extrudate was dried for 18 hours in air and was then broken into ¼" to about ½" lengths and these lengths were calcined in a stream of air at 400° C. for 18 hours.

TABLE I

| Catalyst | Temp., °C. | Pressure | Contact Time (Sec.) | Charge Wt., g. | Percent Cyanoprene |
|---|---|---|---|---|---|
| Filtros | 300 | Atm | 7.1 | 4.93 | No. |
| Do | 400 | 7-8 mm | .875 | 1.00 | No. |
| ZnO:MgO (3:1 parts by weight) | 400 | 7-8 mm | .45 | 4.9 | ~50-55. |
| Do | 450 | 7-8 mm | .048 | 80 | ~6-½. |
| Do | 500 | 7-8 mm | .28 | 40 | 19-26. |
| MgO:ZnO (4:1 parts by weight) | 400 | 7-8 mm | .47 | 1.17 | ~50. |
| Do.[1] | 400 | 7-8 mm | .865 | 5.2 | ~20. |
| Do | 400 | 7-8 mm | 1.3 | 20 | ~30. |
| Do | 400 | 7-8 mm | .95 | 3.19 | ~12-½. |
| H₃PO₄ on Filtros | 300 | Atm | 13 | 8.3 | No. |
| Do | 400 | 7-8 mm | 0.45 | 1.64 | No. |
| KCN on Filtros | 400 | 7-8 mm | .33 | 31 | <6. |
| MgO:ZnO (4:1 parts by weight) | 400 | 7-8 mm | .61 | 41 | ~6. |

[1] Air was used in this experiment, and nitrogen was used in all the others.

*Example II*

The procedure of Example I was repeated using a smaller reactor with a volume of 5 cc. of catalyst and the results are shown in Table II. A number of experiments employing various catalysts at atmospheric pressure and 410° C. but at low partial pressures of 1,2-dicyanocyclobutane are shown in Table II.

TABLE II

| Molar Ratio | | | | Catalyst | Contact Time (Sec.) | Part. Press., (atmospheres) 1,2-dicyano-cyclobutane | Per Pass Conversion to Cyanoprene, percent |
|---|---|---|---|---|---|---|---|
| 1,2-dicyano-cyclobutane | Air | NH₃ | N₂ | | | | |
| 1 | 16 | 1 | | 50% Bi₉PMo₁₂O₄₈ plus 50% SiO₂ | 3-4 | 0.057 | 21 |
| 1 | 5 | 1.5 | 72.5 | 60% USb₄.₈O₁₁.₈ plus 40% SiO₂ | 0.5 | 0.0125 | ~5 |
| 1 | 5 | 1.5 | 72.5 | 60% USb₄.₆O₁₁.₈ plus 40% SiO₂ | 0.5 | 0.0125 | ~8 |

Volume of Catalyst: 5.0 cc.

We claim:
1. The vapor phase process for preparing

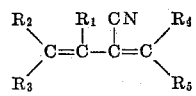

consisting essentially of contacting a cyclic 1,2-dicyanocyclobutane compound of the formula

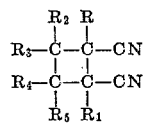

wherein R, $R_1$, $R_2$, $R_3$, $R_4$ and $R_5$ are each hydrogen or alkyl of 1 to 6 carbon atoms, and wherein at least one of R and $R_1$ must be hydrogen, with a basic solid oxidation catalyst at a temperature of from 200 to 600° C. and at a partial pressure of the 1,2-dicyanocyclobutane of 1 to 100 mm.

2. The process of claim 1 carried out in the vapor phase at a temperature of from 250 to 500° C.

3. The process of claim 2 wherein the cyclic compound is 1,2-dicyanocyclobutane.

4. The process of claim 3 wherein the basic solid catalyst is a mixture of zinc oxide and magnesium oxide.

5. The process of claim 3 wherein the basic solid catalyst is bismuth phosphomolybdate.

6. The process of claim 3 wherein the basic solid catalyst is the combined oxides of antimony and uranium.

References Cited

UNITED STATES PATENTS 3,092,654   6/1963   Schreyer _____ 260—464 X

JOSEPH P. BRUST, *Primary Examiner.*